United States Patent [19]

Tazaki et al.

[11] Patent Number: 5,260,394
[45] Date of Patent: Nov. 9, 1993

[54] STYRENE COPOLYMER AND PROCESS FOR PRODUCTION THEREOF

[75] Inventors: Toshinori Tazaki; Masahiko Kuramoto, both of Ichihara, Japan

[73] Assignee: Idemitsu Kosan Co., Ltd., Tokyo, Japan

[21] Appl. No.: 582,836

[22] PCT Filed: Mar. 15, 1990

[86] PCT No.: PCT/JP90/00342
§ 371 Date: Oct. 5, 1990
§ 102(e) Date: Oct. 5, 1990

[87] PCT Pub. No.: WO90/11305
PCT Pub. Date: Oct. 4, 1990

[30] Foreign Application Priority Data

Mar. 20, 1989 [JP] Japan ................ 1-65979
Mar. 31, 1989 [JP] Japan ................ 1-78170

[51] Int. Cl.$^5$ .................. C08F 212/08; C08F 4/642
[52] U.S. Cl. .................. 526/347; 526/160; 526/165; 526/251; 526/281; 526/282; 526/293; 526/308; 526/336; 526/340
[58] Field of Search ............ 526/160, 281, 282, 336, 526/340, 347, 165, 251, 293, 308

[56] References Cited

U.S. PATENT DOCUMENTS 2,989,515  6/1961  Bruton et al. ............ 156/334 X
4,680,353  7/1987  Ishihara et al. ............ 526/160

FOREIGN PATENT DOCUMENTS 0210615  2/1987  European Pat. Off. ............ 526/346
0271875  6/1988  European Pat. Off. ............ 526/165
46-8988  3/1971  Japan .
60-26011  2/1985  Japan .

OTHER PUBLICATIONS

English Language Translation of Japanese Patent 60-26011, published Feb. 1985.

Hackh's Chem. Dictionary, J. Grant (ed.) McGraw-Hill Co., N.Y., 27, 712 (1969).

Primary Examiner—Fred Teskin
Attorney, Agent, or Firm—Oblon, Spivak, McClelland, Maier & Neustadt

[57] ABSTRACT

A novel styrene copolymer comprising a styrene repeating unit (a) represented by the general formula:

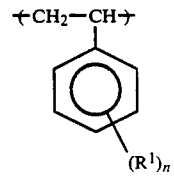

(wherein $R^1$ is a hydrogen atom or a hydrocarbon group having not more than 20 carbon atoms; n is an integer of 1 to 3 and when n is 2 or 3, $R^1$s may be the same or different) and olefin repeating unit (b) represented by the general formula:

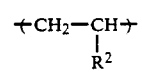

(wherein $R^2$ is a hydrogen atom or a saturated hydrocarbon group having not more than 20 carbon atoms) or diene repeating unit, which contains 0.1 to 99.9 wt. % of said olefin repeating unit (b) or diene repeating unit (c) wherein intrinsic viscosity measured in 1,2,4-trichlorobenzene at 135° C. is 0.07 to 20 dl/g and the stereoregularity of the styrene repeating unit chain is a high degree of syndiotactic configuration. This styrene copolymer is excellent in heat resistance and chemical resistance, and further it can be injection molded at low temperature, and has good compatibility with other resine and the like.

23 Claims, 2 Drawing Sheets

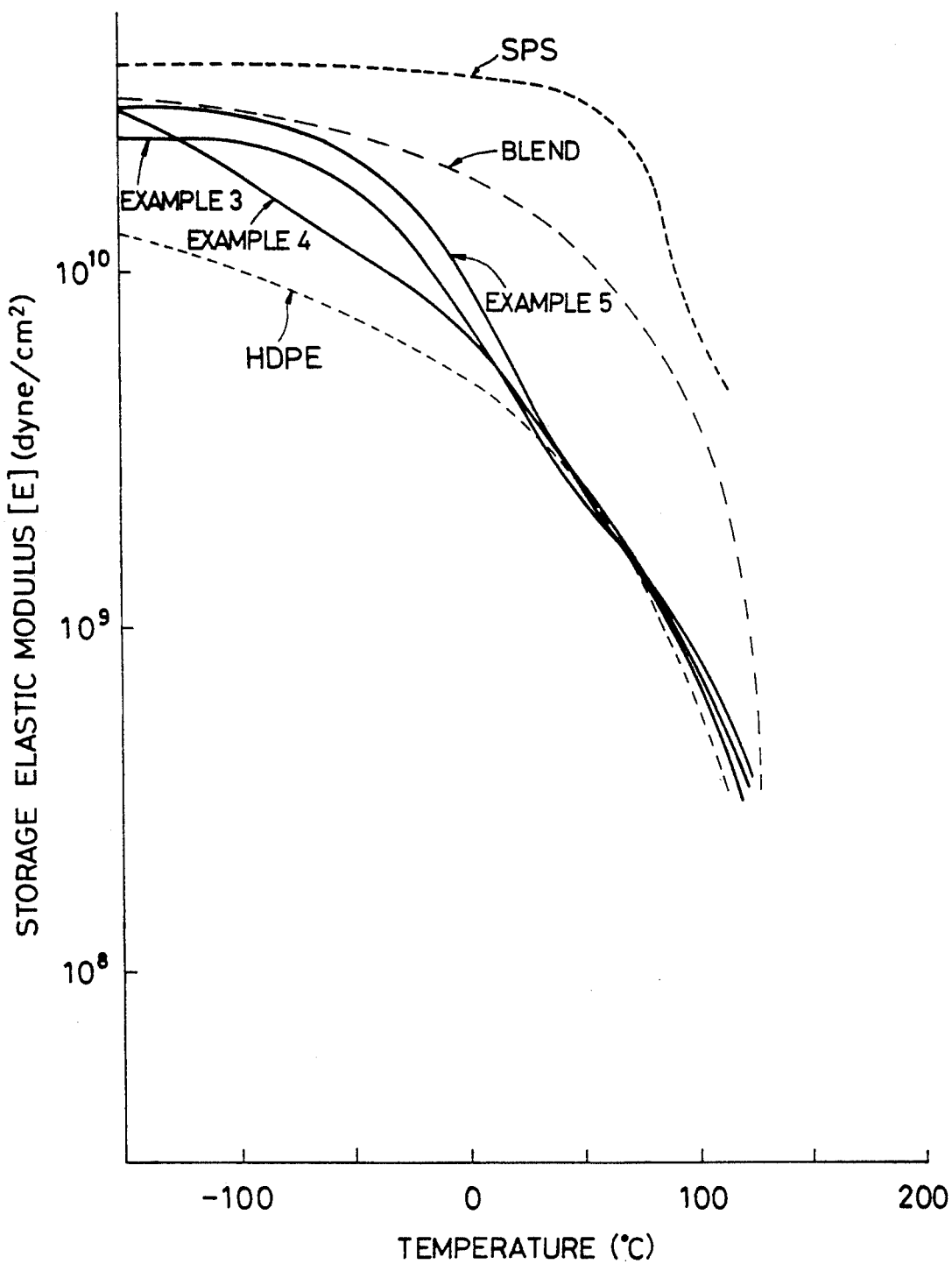

STYRENE COPOLYMER AND PROCESS FOR PRODUCTION THEREOF

FIELD OF THE INVENTION

The present invention relates to styrene copolymer and process for production thereof, more specifically it relates to copolymer having a specific stereostructure which comprises a styrene monomer and olefin monomer or diene monomer, and to an efficient process for production thereof.

BACKGROUND OF THE INVENTION

A styrene polymer produced by the radical polymerization method, etc. has an atactic configuration in stereostructure. It is molded into various shapes by various molding methods such as injection molding, extrusion molding, blow molding, vacuum molding and cast molding, and is widely used for domestic electric appliances, office equipments, domestic appliances, packaging containers, toys, furniture, synthetic papers and other industrial materials.

However, the styrene polymer having an atactic configuration has drawbacks of insufficient heat resistance and chemical resistances.

The group of the present inventors have succeeded to develop a styrene polymer having a high degree of syndiotacticity, and also developed a styrene polymer in which other components are copolymerized with the styrene monomer (Japanese Patent Application Laid-Open Nos. 104818/1987 and 241009/1989). Such polymer or copolymer having a syndiotactic configuration has excellent heat resistance, chemical resistance and electric characteristic, and expected to be applied in various fields.

However, in the above polymer, particularly, syndiotactic polystyrene, glass transition temperature is high, i.e., 90° to 100° C., and melting point is 270° C. Accordingly, the polymer has defects that it cannot sufficiently show its characteristics unless injection molding temperature is set at high temperature. In addition, the molded product obtained by using a high temperature mold is required to be improved in impact resistance. The above polymer has disadvantages in that it has poor compatibility with polyolefins such as polyethylene, polypropylene and the like. Such polymer has insufficient compatibility and adhesion with other resin, inorganic fillers or the like.

Particularly, compared with olefin polymer which is characterized in its flexibility, the syndiotactic polystyrene should be improved in its solvent resistance, heat resistance and impact resistance.

Accordingly, the present inventors have studied intensively to decrease the glass transition temperature of syndiotactic polystyrene to enable injection molding at low temperature and further to improve impact resistance and compatibility and adhesion with other resins including polyolefin and inorganic fillers.

As the results, it has been found that copolymerization of styrene monomer and olefin monomer or diene monomer in the presence of a specific catalyst provides a copolymer having styrene repeating unit chain with syndiotactic configuration copolymerized with olefin component or diene component. Such copolymer has excellent heat resistance and chemical resistance. Further, it can be injection molded at low temperature because of its reduced glass transition temperature. Moreover, it has good compatibility with other resins.

Thus it has been found that the objective modification can be attained.. The present invention has been established based on such findings.

SUMMARY OF THE INVENTION

The present invention provides styrene copolymer which comprises a styrene repeating unit (a) represented by the general formula (I):

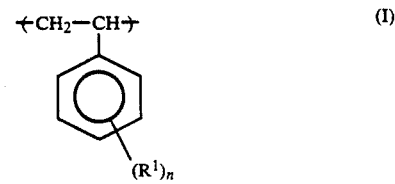

(wherein $R^1$ is a hydrogen atom, a halogen atom or a hydrocarbon group having not more than 20 carbon atoms, n is an integer of 1 to 3, and when n is plural, $R^1$s may be the same or different)
and an olefin repeating unit (b) represented by the general formula (II):

(wherein $R^2$ is a hydrogen atom or a saturated hydrocarbon group having not more than 20 carbon atoms) or a diene repeating unit (c), which contains 0.1 to 99.9% (by weight) of an olefin repeating unit (b) or a diene repeating unit (c), wherein intrinsic viscosity (measured in 1,2,4-trichlorobenzene at 135° C.) is 0.07 to 20 dl/g and the stereostructure of the styrene repeating unit chain is high degree of syndiotactic configuration.

Further, the present invention provides a process for producing the above styrene copolymer which comprises copolymerizing a styrene monomer represented by the general formula (I'):

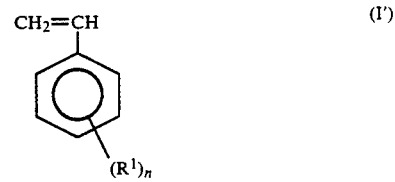

(wherein $R^1$ and n are the same as defined above) and an olefin monomer represented by the general formula (II'):

(wherein $R^2$ is the same as defined above) or diene monomer in the presence of a catalyst comprising a transition metal compound and alkylaluminoxane.

BRIEF EXPLANATION OF DRAWINGS

FIG. 2 shows the results of the measurement of dynamic viscoelasticity of the samples of styrene copolymers obtained in Examples 3 to 5 and the control samples.

BEST MODE TO CONDUCT THE INVENTION

Figure 1:
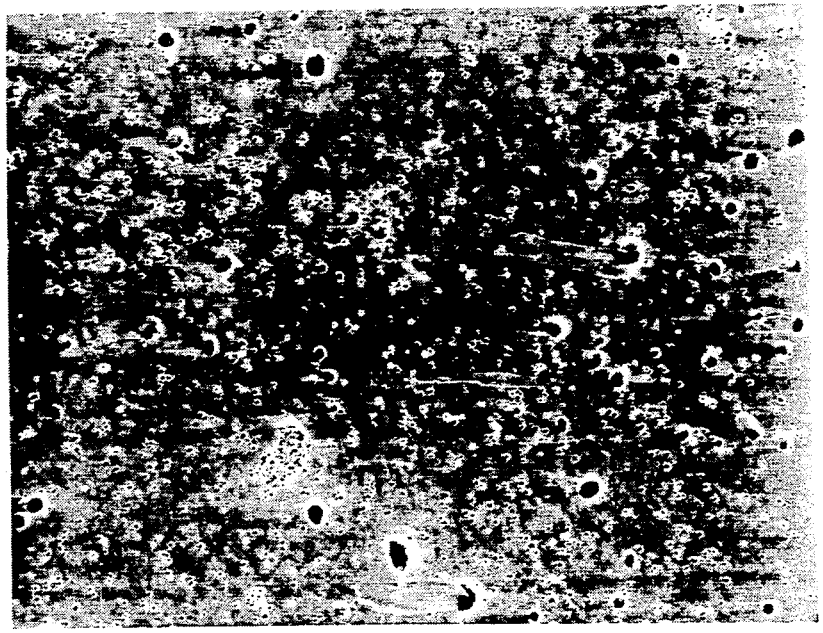
FIG. 1 is a scanning electron micrograph of the styrene copolymer obtained in Example 1.

The styrene copolymer of the present invention comprises, as mentioned above, a styrene repeating unit (a) represented by the general formula (I) and an olefin repeating unit (b) represented by the general formula (II) or a diene repeating unit (c), wherein the repeating unit represented by the general formula (I) is derived from the styrene monomer represented by the above general formula (I'). In the formula, $R^1$ is a hydrogen atom, a halogen atom (for example, chlorine, bromine, fluorine, iodine) or a hydrocarbon group having not more than 20 carbon atoms, preferably, 10 to 1 carbon atoms (for example, a saturated hydrocarbon group (particularly an alkyl group) such as methyl, ethyl, propyl, butyl, pentyl, hexyl or a unsaturated hydrocarbon group such as vinyl). The repeating unit represented by the general formula (I) includes an alkylstyrene unit such as a styrene unit, p-methylstyrene unit, m-methylstyrene unit, o-methylstyrene unit, 2,4-dimethylstyrene unit, 2,5-dimethylrstyrene unit, 3,4-dimethylstyrene unit, 3,5-dimethylstyrene unit, p-ethylstyrene unit, m-ethylstyrene, p-tert-butylstyrene unit; a divinyl benzene unit such as p-divinylbenzene unit, m-divinylbenzene unit, trivinylbenzene unit; a halogenated styrene unit such as p-chlorostyrene unit, m-chlorostyrene unit, o-chlorostyrene unit, p-bromostyrene unit, m-bromostyrene unit, o-bromostyrene unit, p-fluorostyrene unit, m-fluorostyrene unit, o-fluorostyrene unit, o-methyl-p-fluorostyrene unit; or a mixture of two or more of them.

On the other hand, the olefin repeating unit (b) represented by the general formula (II) is derived from the olefin monomer represented by the above general formula (II'). In the formula, $R^2$ is a hydrogen atom or olefins having not more than 20 carbon atoms, preferably a hydrogen atom or olefins having 10 to 1 carbon atoms, for example, an olefin such as ethylene, propylene, 1-butene, 1-pentene, 3-methyl-butene-1, 1-hexene, 3-methyl-pentene-1, 4-methylpentene-1, 1-octene, 1-decene or the like may be used. Among them, ethylene, propylene, 1-butene, 1-hexene or a mixture thereof may be preferred. More preferably, ethylene, propylene or a mixture thereof.

The diene repeating unit (c) is derived from various kinds of diene monomers. The diene monomers herein used are not particularly limited, and they are roughly divided into conjugated straight chain diene monomer, unconjugated straight chain diene monomer, conjugated cyclic diene monomer and unconjugated cyclic diene monomer. Among them, conjugated straight chain diene monomer includes compounds represented by the general formula:

(wherein $R^a$ and $R^b$ each are a hydrogen atom, an alkyl group, an aryl group or a halogen atom, $R^c$ is a hydrogen atom or a saturated hydrocarbon group having not more than 6 carbon atoms), for example, 1,3-butadiene or alkyl-substituted butadienes such as isoprene, 1,3-pentadiene; aryl-substituted butadienes such as 1- or 2-aryl-1,3-butadiene, 1- or 2-phenyl-1,3-butadiene, 2-phenyl-3-methyl-1,3-butadiene; halo-substituted butadiene such as 2-chloro-1,3-butadiene, 2-fluoro-1,3-butadiene. Unconjugated straight chain diene monomer includes 1,4-pentadiene, 1,5-hexadiene, 1,7-octadiene. Conjugated cyclic diene monomer includes, for example, 1,3-cyclohexadiene, 1,3-cyclooctadiene.

Unconjugated cyclic diene monomer includes, for example, norbornadiene, 1,5-cyclooctadiene, 5-vinylnorbornene and the like.

Among them, unconjugated straight chain diene monomer and unconjugated cyclic diene monomer are desirably used.

In the copolymer of the present invention, diene repeating unit (c) is composed of the above diene monomers which are polymerized, and when said diene repeating unit (c) consists of the conjugated straight chain diene monomers of the above general formula (III), it is classified into 1,2-polymerized type represented by the general formula:

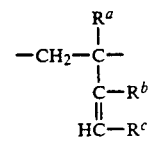

and 1,4-polymerized type represented by the general formula:

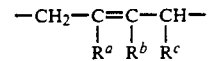

By polymerization, 1,2-polymerized type provides diene repeating units having any one of syndiotactic configuration, isotactic configuration, atactic configuration and a mixture thereof, and 1,4-polymerized type provides diene repeating units having cis- or trans-configuration. Polymerization of unconjugated cyclic monomer provides diene repeating units having trans annular configuration. In the present invention, however, diene repeating unit (c) with any configuration may be sufficiently used so long as it gives no effect on syndiotacticity of the styrene chain.

In the copolymer of the present invention, the styrene repeating unit (a) may be composed of two or more components, which applies to olefin repeating unit (b) or diene repeating unit (c). Thus, bi-, ter-, or tetra- copolymer can be synthesized. The content of the above olefin repeating unit (b) or diene repeating unit (c) is generally 0.1 to 99.9 wt. %, preferably 1 to 99 wt. %, more preferably 5 to 95 wt. % of the copolymer. When the content of the olefin repeating unit (b) or the diene repeating unit (c) is less than 0.1 wt. %, the objective improvement of the present invention such as decrease of glass transition temperature or improvement of impact resistance can not be sufficiently attained. On the other hand, when it is over 99.9 wt. %, the characteristic of the styrene polymer having syndiotactic configuration, that is, heat resistance may not be developed.

As for the molecular weight of this copolymer, intrinsic viscosity measured in 1,2,4-trichlorobenzene solution (135° C.) is generally 0.07 to 20 dl/g, preferably, 0.3 to 10 dl/g. When intrinsic viscosity is less than 0.07 dl/g, the copolymer can not be put into practical use because of its poor dynamic properties. Those having intrinsic viscosity of over 20 dl/g are not suitable for the conventional melt molding.

In the present invention, the third component can be added so long as it cannot markedly degrade the properties of the resulting copolymers or the syndiotactic configuration of the styrene repeating unit (a) chain. Such third component includes dienes, vinylsiloxanes, unsaturated carboxylic acid esters, acrylonitriles for copolymers consisting of styrene repeating unit (a) and olefin repeating unit (b); and vinylsiloxanes, α-olefins, unsaturated carboxylic acid esters, acrylonitriles, N-substituted maleimides for copolymers consisting of styrene repeating unit (a) and diene repeating unit (c).

The styrene copolymer of the present invention has a styrene repeating unit (a) chain having a high degree of syndiotactic configuration. Here, a high degree of syndiotactic configuration in the styrene polymers means that stereochemical structure is a high degree of syndiotactic configuration, that is, the stereostructure in which phenyl groups or substituted phenyl groups as side chains are located alternately in opposite directions relative to the main chain consisting of carbon-carbon bonds. Tacticity is quantitatively determined by the nuclear magnetic resonance method ($^{13}$C-NMR method) using carbon isotope. The tacticity measured by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. In the styrene copolymer having a high degree of syndiotactic configuration in the present invention, the proportion of racemic diad is at least 75%, preferably at least 85%, or proportions of racemic pentad is at least 30% and preferably at least 50%. However, the degree of syndiotacticity may somewhat vary depending on the types of the substituent or content of the olefin repeating unit (b) or diene repeating unit (c).

The copolymer of the present invention described above with the desired configuration and reactive substituents can be produced by copolymerization of the monomers corresponding to the repeating units (a), (b) and (c), and fractionation, blend or application of other technique of organic synthesis using the resulting copolymer as a starting material.

Among them, the above-described process of the present invention more efficiently provides the styrene copolymer of high quality.

The starting monomer used in the process for production of the present invention is styrene monomer represented by the general formula (I') and olefin monomer represented by the general formula (II') or diene monomer. The styrene monomer and olefin monomer or diene monomer are copolymerized to constitute the corresponding repeating units. Accordingly, examples of the styrene monomer, olefin monomer or diene monomer include the compounds corresponding to the examples described for the above styrene repeating unit (a), olefin repeating unit (b) and diene repeating unit (c).

In the process of the present invention, these styrene monomers and olefin monomers or diene monomers are used as starting materials and copolymerized in the presence of a catalyst which contains transition metal compound (A) and aluminoxane (B) as main components.

In this case, component (A), i.e., the transition metal compound includes various compounds, preferably at least one compound selected from transition metal compounds represented by the general formula:

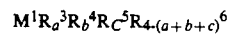  (α)

  (β)

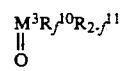  (γ)

or

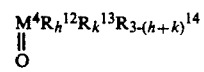  (δ)

(wherein $R^3$ to $R^{14}$ each are a hydrogen atom, a halogen atom, an alkyl group having 1 to 20 carbon atoms, an alkoxy group having 1 to 20 carbon atoms, an aryl group having 6 to 20 carbon atoms, an arylalkyl group having 7 to 20 carbon atoms, an aryloxy group having 6 to 20 carbon atoms, an acyloxy group having 1 to 20 carbon atoms, an acetylacetonyl group, a cyclopentadienyl group, a substituted cyclopentadienyl group or an indenyl group, and a, b and c represent integers (not less than 0) of $0 \leq a+b+c \leq 4$, d and e indicate integers (not less than 0) of $0 \leq d+e \leq 3$ f is an integer of $0 \leq f \leq 2$, h and k are integers (not less than 0) of $0 \leq h+k \leq 3$, $M^1$ and $M^2$ are titanium, zirconium, hafnium, or vanadium, $M^3$ and $M^4$ indicate vanadium). Among these transition metal compounds, those represented by the above general formula (α) wherein $M^1$ is titanium or zirconium are preferably used.

Those represented by $R^3$ to $R^{14}$ in the above formula include halogen, for example, chlorine, bromine, iodine or fluorine. Substituted cyclopentadienyl group includes cyclopentadienyl group which is substituted by at least one alkly group having 1 to 6 carbon atoms, for example, methylcyclopentadienyl, 1,2-dimethylcyclopentadienyl, 1,3-dimethylcyclopentadienyl, 1,3,4-trimethylcyclopentadienyl, and pentamethylcyclopentedienyl.

$R^3$ to $R^{14}$ in the above formula independently represent a hydrogen atom, an alkyl group having 1 to 20 carbon atoms (e.g., methyl, ethyl, propyl, n-butyl, isobutyl, amyl, isoamyl, octyl, 2-ethylhexyl), an alkoxy group having 1 to 20 carbon atoms (e.g., methoxy, ethoxy, propoxy, butoxy, hexyloxy, octyloxy, 2-ethylhexyloxy), an aryl group having 6 to 20 carbon atoms (e.g., phenyl, naphthyl), an arylalkyl group having 7 to 20 carbon atoms (e.g., benzyl, phenetyl, 9-anthrylmethyl), an acyloxy group having 1 to 20 carbon atoms (e.g., acetyloxy, stearoyloxy). These $R^3$ to $R^{14}$ may be the same or different so long as they satisfy the above requirements. They may be monodentate ligands, or ligands may bond to each other to give multidentate ligand.

The more preferable example is a titanium compound represented by the general formula:

TiRXYZ  

(wherein R is a cyclopentadienyl group, a substituted cyclopentadienyl group or an indenyl group, and X, Y and Z are independently a hydrogen atom, an alkly group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom). The substituted cyclopentadienyl group represented by R in the above formula is a cyclopentadienyl group substituted by one or more alkyl groups having 1 to 6 carbon atoms, specifically a methylcyclopentadienyl group, a 1,2-dimethylcyclopentadienyl group, a 1,3-dimetylcyclopentadienyl group, a 1,3,4-trimethylcyclopentadienyl group, a pentamethylcyclopentadienyl group or the like. X, Y and Z are independently a hydrogen atom, an alkyl group having 1 to 12 carbon atoms (specifically, methyl, ethyl, propyl, n-butyl, isobutyl, amyl, isoamyl, octyl, 2-ethylhexyl group, etc.), an alkoxy group having 1 to 12 carbon atoms (specifically, methoxy, ethoxy, propoxy, butoxy, amyloxy, hexyloxy, octyloxy, 2-ethylhexyloxy, etc.), an aryl group having 6 to 20 carbon atoms (specifically, phenyl, naphthyl, etc.), an aryloxy group having 6 to 20 carbon atoms (specifically, phenoxy, etc.), an arylalkyl group having 6 to 20 carbon atoms (specifically, benzyl, etc.), or a halogen atom (specifically, chlorine, bromine, iodine or fluorine).

Specific examples-of the titanium compound represented by the general formula (ξ) are cyclopentadienyltitanium trimethyl, cyclopentadienyltitanium triethyl, cyclopentadienyltitanium tripropyl, cyclopentadienyltitanium tributyl, mentylcyclopentadienyltitanium trimethyl, 1,2-dimethylcyclopentadienyltitanium trimehtyl, pentamethylcyclopentadienyltitanium trimethyl, pentamethylcyclopentadienyltitanium triethyl, pentamethylcyclopentadienyltitanium tripropyl, pentamethylcyclopentadienyltitanium tributyl, cyclopentadienyltitanium methyldichloride, cyclopentadienyltitanium ethyldichloride, pentamethylcyclopentadienyltitanium methyldichloride, pentamethylcyclopentadienyltitanium ethyldichloride, cyclopentadienyltitanium dimethylmonochloride, cyclopentadienyltitanium diethylmonochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitaniuin tripropoxide, pentamethylcyclopentadienyltitanium tributoxide, pentamethylcyclopentadienyltitanium triplienoxide, cyclopentadienyltitanium trichloride, pentamethylcyclopentadienyltitanium trichloride, cyclopentadienyltitanium methoxydichloride, cyclopentadienyltitanium dimethoxychloride, pentamethylcyclopentadienyltitanium methoxydichloride, cyclopentadienyltitanium tribenzyl, pentamethylcyclopentadienylmethyltitanium diethoxy, indenyltitanium trichloride, indenyltitanium trimethoxide, indenyltitanium triethoxide, indenyltitanium trimethyl, indenyltitanium tribenzyl and the like.

As the component (B) constituting the main component of the catalyst in combination with the above titanium compound component (A), alkylaluminoxane is used. For example, alkylaluminoxane represented by the general formula:

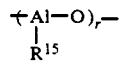  (η)

(wherein $R^{15}$ is an alkyl group having 1 to 8 carbon atoms, and r is a number of 2 to 50). These alkylaluminoxanes can be prepared by various methods. For example, (1) the method in which alkylaluminum is dissolved in an organic solvent and the resulting solution is contacted with water, (2) the method in which alkylaluminum is first added at the time of polymerization, and then water is added thereto, and (3) the method in which water of crystallization contained in a metal salt and the like, or water adsorbed in an inorganic material or an organic material is reacted with alkylaluminum. The above water may contain ammonia, amine such as ethylamine and the like, a sulfur compound such as hydrogen sulfide and the like and a phosphorus compound such as phosphite and the like in an amount up to 20%.

Suitable examples of alkylaluminoxane used as the component (B) are methylaluminoxane in which the area of the high magnetic field component in the methyl proton signal region due to the aluminum-methyl group (Al—$CH_3$) bond as observed by the proton nuclear magnetic resonance method is not more than 50%. That is, in a proton nuclear magnetic resonance ($^1$H—NMR) spectral analysis of the above contact product in toluene at room temperature, the methyl proton signal due to Al—$CH_3$ is observed in the region of 1.0 to $-0.5$ ppm (tetramethylsilane (TMS) standard.) Since the proton signal of TMS (0 ppm) is in the region in which the methyl proton due to Al—$CH_3$ is observed, this methyl proton signal due to Al—$CH_3$ is measured based on the methyl proton signal of toluene (2.35 ppm) based on TMS standard, and when divided into the high magnetic field components (i.e. $-0.1$ to $-0.5$ ppm) and other magnetic field components (i.e. 1.0 to $-0.1$ ppm), alkylaluminoxane in which high magnetic field component is not more than 50%, preferably 45 to 5% of the total signal area is used as the component (B) of the catalyst of the method of the present invention.

The catalyst to be used in the process of the present invention contains the above components (A) and (B) as main components. If desired, other catalyst components, for example, trialkylaluminum represented by the general formula:

$$AlR^{16}_3$$

(wherein $R^{16}$ is an alkyl group having 1 to 8 carbon atoms), or other organometallic compounds can be added. Further, organic compounds represented by the general formula:

$$W-R^{17}-(Q)_m P-R^{18}-W' \qquad (\theta)$$

(wherein $R^{17}$ and $R^{18}$ are a hydrocarbon group having 1 to 20 carbon atoms, a substituted aromatic hydrocarbon group having 7 to 30 carbon atoms or a substituted aromatic hydrocarbon group having substituents containing hetero atoms such as oxygen, nitrogen, sulfur and the like and having 6 to 40 carbon atoms, Q is a hydrocarbon group having 1 to 20 carbon atoms,

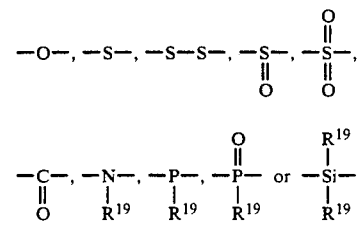

(wherein $R^{19}$ is a hydrocarbon group having 1 to 6 carbon atom), W and W' are a hydroxyl group, an aldehyde group, a carboxyl group, and m is an integer of 0 to 5), can be added so long as the stereoregularity is not damaged. The examples of the organic compound represented by the general formula (θ) include, for example, 2,2'-dihydroxy-3,3'-di-t-butyl-5,5'-dimethyldiphenylsulfide, 2,2'-dihydroxy-3,3'-di-t-butyl-5,5'-dimethyldiphenylether and the like.

The ratio of the component (A) to the component (B) in the catalyst varies with the type of each catalyst component, the type of each styrene monomer represented by the general formula (I') and olefin monomer represented by the general formula (II') or diene monomer as the starting materials, and other conditions, and thus cannot be determined unconditionally. Usually, the ratio of aluminum contained in component (B) to titanium contained in component (A), i.e. aluminum/titanium (molar ratio) is 1 to $10^6$, preferably 10 to $10^4$.

In accordance with the process of the present invention, the styrene monomers represented by the above general formula (I') and olefin monomers represented by the general formula (II') or diene monomers are copolymerized in the presence of a catalyst containing components (A) and (B) as the main components. This copolymerization may be carried out in various methods such as bulk copolymerization, solution copolymerization or suspension copolymerization. Solvents which may be used for copolymerization include aliphatic hydrocarbons such as pentane, hexane, heptane, decane and the like, alicyclic hydrocarbons such as cyclohexane and the like, or aromatic hydrocarbons such as benzene, toluene, xylene and the like. The polymerization temperature is not particularly limited, but generally, 0° to 100° C., preferably, 10° to 70° C. The polymerization period of time is 5 minutes to 24 hours, preferably not less than one hour. Further, it is effective to conduct copolymerization in the presence of hydrogen to control the molecular weight of the resulting styrene copolymers.

The styrene copolymers obtained by the process of the present invention have a high degree of syndiotacticity of the styrene repeating unit chain. After polymerization, the copolymers may be delimed with a washing solution containing hydrochloric acid or the like, if necessary, and after washing, drying under reduced pressure, the solubles may be removed by washing with a solvent such as methyl ethyl ketone or the like to obtain styrene copolymer of high purity having an extremely high degree of syndiotacticity.

The present invention will be described in more detail with reference to examples.

EXAMPLE 1

(1) Preparation of Methylaluminoxane

In a 500-milliliter glass vessel which had been purged with argon were placed 200 ml of toluene, 17.8 g (71 mmol) of copper sulfate pentahydrate ($CuSO_4.5H_2O$) and 24 ml (250 mmol) of trimethylaluminum, which were then reacted at 40° C. for 8 hours. Then, solids were separated from the reaction mixture, and the toluene was distilled away from the solution as obtained above under reduced pressure at room temperature to obtain 6.7 grams of a contact product (methylaluminoxane). The molecular weight of the contact product as determined by the freezing point depression method was 610. As for the high magnetic field component as determined by the above $^1H$-NMR method, methyl proton signal due to (Al—$CH_3$) bond as observed by the proton nuclear magnetic resonance spectrum in a toluene solution at room temperature was found in the region from 1.0 to $-0.5$ ppm (tetramethylsilane standard). Since the proton signal of tetramethylsilane (0 ppm) was found in the observation region due to methyl proton due to (Al—$CH_3$) bond, this methyl proton signal due to (Al—$CH_3$) bond was determined based on the methyl proton signal of toluene (2.35 ppm) (tetramethylsilane standard) and divided into high magnetic field component (i.e., $-0.1$ to $-0.5$ ppm) and other magnetic field component (i.e., 1.0 to $-0.1$ ppm). The high magnetic field component was 43%.

(2) Production of Styrene-Ethylene Copolymer

In a 1.0 liter reactor equipped with a stirrer were placed 20 ml of toluene, 180 ml of styrene and 10.0 mmol as aluminum atom of methylaluminoxane obtained in (1) above, and stirred at the polymerization temperature of 70° C. for 30 minutes. Then, 0.05 mmol as titanium atom of pentamethylcyclopendadienyltitanium trimethoxide was added. Further, ethylene monomer was introduced in the reactor through an exclusive line, the pressure in the reactor was increased to 8.0 $kg/cm^2G$. Subsequently, polymerization was performed at 70° C. for 4 hours. After the polymerization, the unreacted gas was removed, methanol was poured to cease the reaction. Further, a mixture of methanol and hydrochloric acid was added to decompose the catalyst components. The yield of thus obtained styrene-ethylene copolymer was 12.2 g. Intrinsic viscosity measured in 1,2,4-trichlorobenzene solution at 135° C. was 1.30 dl/g.

The fact that the styrene chain of this styrene-ethylene copolymer has syndiotactic configuration was confirmed by the results of differential scanning calorimeter (DSC) and the nuclear magnetic resonance spectrum using carbon isotope ($^{13}C$-NMR).

(a) Determination by DSC

After the styrene copolymer obtained in Example 1 was sufficiently dried, then 10 mg portion was charged in a vessel for DSC. The temperature was increased from 50° C. to 300° C. at a rate of 20° C./min, then kept at 300° C. for 5 minutes, and decreased from 300° C. to 50° C. at a rate of 20° C./min. This sample was heated again from 50° C. to 300° C. at a rate of 20° C./min, and the endo- and exothermic pattern was observed. The apparatus used was DSC-II manufactured by Perkin-Elmer.

As the result, the glass transition temperature and the melt temperature of this copolymer was 80° C. and 262° C., respectively.

The facts that the conventional atactic polystyrenes have no melt temperature, the melt temperature of isotactic polystyrene is 230° C. and the melt temperature of the copolymer never exceeds the higher melt temperature of the homopolymers shows that the styrene chain of this copolymer has syndiotactic configuration and the copolymer is crystalline substance.

On the other hand, the glass transition temperature and melt temperature of ethylene homopolymer, which were determined for reference, were $-90°$ C. and 126° C., respectively. The glass transition temperature of syndiotactic polystyrene was 96° C.

Accordingly, the glass transition temperature of the resulting copolymer was between those of each homopolymers, and it is supposed to be a copolymer.

(b) Determination by $^{13}$C-NMR

The above styrene copolymer was analyzed in 1,2,4-trichlorobenzene solution at 135° C. As the result, the aromatic signals were observed at 145.1 ppm and 145.9 ppm. Accordingly, the styrene chain was confirmed to have syndiotactic configuration. Further, it has a signal at 29.5 ppm due to ethylene chain. The content of the ethylene chain in the copolymer was 4.0 wt. %. The apparatus used was FX-200 manufactured by Nippon Denshi Co.

(c) Morphology of the molded products

The copolymers were injection molded at melt temperature of 300° C. and at mold temperature of 100° C. The cross section of the injection molded product was observed. As the result, it showed good dispersion state with very small domains dispersed therein, which can not be observed in the general incompatible mixture. Izod impact strength of the molded product was measured according to JIS-K7110.

The scanning electron micrograph (SEM) of the copolymers obtained above is shown in FIG. 1. FIG. 1 shows that both styrene and ethylene structural units are highly dispersed.

These facts show that the copolymer is a crystalline styrene-ethylene copolymer which contains styrene chain having syndiotactic configuration.

EXAMPLES 2 TO 7 AND COMPARATIVE EXAMPLES 1 AND 2

The procedure of Example 1 was repeated using starting materials, catalysts and polymerization conditions shown in Table 1, to obtain styrene-ethylene copolymers. The characteristics of the resulting copolymers as well as the result of Example 1 are shown in Table 1.

The copolymer samples obtained in Examples 3 to 5, and, as comparative samples, syndiotactic polystyrene (SPS) sample, polyethylene (HDPE) sample and a blend sample which was prepared by completely dissolving 20 wt. % of syndiotactic polystyrene and 80 wt. % of polyethylene in 1,2,4-trichlorobenzene at 180° C., precipitating in methanol (tightly interblended state) were prepared by press molding to be used as test samples for measurement of dynamic viscoelasticity. Subsequently, these six samples of four types were measured for dynamic viscoelasticity using Rheovibron DDV-II-EA type apparatus (frequency, 110 Hz; Linear Rise, 2.0) manufactured by Orientek Co. The results are shown in FIG. 2. In the figure, the ordinate shows a range of the measuring temperature (° C.), the abscissa shows storage elastic modulus (E) (dyne/cm$^2$). The results of the measurement of the samples of Examples 3 to 5 show that the value (E) thereof decreased in the range from lower temperature to 95° to 96° C. which corresponds to glass transition temperature of syndiotactic polystyrene, as compared with an artificial tightly interblended syndiotactic polystyrene and polyethylene. Thus, flexibility is supposed to be imparted to the above copolymer.

Originally, syndiotactic polystyrene and polyethylene are incompatible. Therefore, the operation to induce tightly interblended state results in phase separation and exfoliation during injection molding so long as it is a blend. The copolymer according to the present invention, however, has highly dispersed structure as shown in FIG. 1, exfoliation during molding is prevented and, as is obvious from the measurement of dynamic viscoelasticity, the molded products provided with flexibility can be more readily obtained compared with syndiotactic polystyrene.

EXAMPLES 8 AND 9

In the same manner as that of the process for production of styrene-ethylene copolymer in the above Example 1, p-methylstyrene-ethylene copolymer was produced. The results are shown in Table 1.

The resulting p-methylstyrene-ethylene copolymer was extracted with methylethylketone or the like, and the DSC analysis for the extraction residue was carried out under the same conditions as those in Example 1 to find only melting point due to ethylene skeleton (121° to 122° C.). However, the extraction residue was analyzed by $^{13}$C-NMR using, 1,2,4-trichlorobenzene as a solvent. As the result, pointed singlet peak was observed at 142.3 to 142.5 ppm. This result is identical to that described in Japanese Patent Application Laid-Open No. 187708/1987 and suggests that p-methylstyrene unit has syndiotactic configuration. Further, peaks due to ethylene skeleton were observed at 29.4 to 29.6 ppm as Example 1, which shows that the product is a copolymer.

The above results show that the copolymer is a crystalline p-methylstyrene-ethylene copolymer with syndiotactic configuration containing p-methylstyrene chain.

EXAMPLE 10

In a 1.0-liter reactor equipped with a stirrer which had been purged with argon were placed 400 ml of toluene, 2.5 ml (5.0 mmol) of tri-isobutyl aluminum and 5.0 mmol as aluminum atom of methylaluminoxane obtained in the above Example 1 and 50.0 μmol as titanium atom of pentamethylcyclopentadienyltitanium trimethoxide, and the resultant was maintained at 50° C.

Subsequently, propylene monomer was introduced into the reactor through an exclusive line, the content of the reactor was sufficiently replaced with propylene monomer, then pressure in the reactor was increased to 4.5 kg/cm$^2$G.

Then, an exclusive line for propylene monomer is blocked while the pressure in the reactor was maintained at 4.5 kg/cm$^2$G, and ethylene monomer was introduced into the reactor through an exclusive line and the pressure was increased to 9.0 kg/cm$^2$G.

The resultant was stirred at the polymerization temperature of 50° C. for 20 minutes, then 70 ml of styrene monomer was introduced through an exclusive line. Then, polymerization was carried out at 50° C. for 4 hours with stirring. After the polymerization, the unreacted gas was removed, a mixture of methanol and hydrochloric acid was poured to decompose the catalytic components.

The yield of thus obtained styrene polymer was 4.32 grams. For separation of atactic polystyrene from the resulting styrene polymer, the polymer was washed for 8 hours using Soxhlet extractor and methlyethylketone as a solvent.

Further, for separation of ethylene-propylene copolymer, washing was carried out for 8 hours using n-heptane as a solvent. The composition of thus extracted ethylene-propylene copolymer calculated from $^1$H-NMR was 53.7 mol. % of ethylene unit and 46.3 mol. % of propylene unit. Melting point was 100° C.

Further, for separation of polyethylene from the polymer which is insoluble in methylethylketone and n-heptane, extraction was carried out for 8 hours using methylene chloride as a solvent. As the result, the objective styrene polymer, that i.e., polymer soluble in methylene chloride was 25.4 wt. %.

The yield of styrene polymer soluble in methylene chloride after separation of atactic polystyrene, ethylene-propylene copolymer and polyethylene was 0.55 gram, and intrinsic viscosity measured in 1,2,4-trichlorobenzene at 135° C. was 2.06 dl/g.

According to the result of measurement of infrared absorption spectrum, absorptions due to ethylene, propylene structure were found at 720, 1,150 and 1,378 cm$^{-1}$. The composition calculated from $^1$H-NMR spectrum was 67.8 mol. % of styrene unit, 16.7 mol. % of ethylene unit and 15.4 mol. % of propylene unit.

The composition of ethylene-propylene component contained therein was within the composition range of ethylene-propylene copolymer soluble in n-heptane, thus it was confirmed that ethylene-propylene copolymer does not exist in the polymer.

Further, according to the analysis by $^{13}$C-NMR spectrum (1,2,4-trichlorobenzene as a solvent), absorption due to syndiotactic configuration of styrene chain was found at 145.15 ppm. Syndiotacticity in racemic pentad calculated from peak area was 85%. According to the measurement by DSC, melting point was found only at 233.9° C.

The styrene polymer was injection molded at melt temperature of 300° C. and mold temperature of 100° C. The cross section of this injection molded product was observed by electron microscope. As the result, fine domain structure with extremely good dispersion was found, which can not be observed in the general incompatible mixture.

The above facts show that this styrene polymer soluble in methylene chloride is a crystalline polymer consisting of styrene chain having syndiotactic configuration and ethylene-propylene configuration.

EXAMPLE 11

In a 1.0-liter reactor equipped with a stirrer which had been purged with argon were placed 400 ml of toluene, 700 ml of styrene monomer, 2.5 ml (5.0 mmol) of tri-isobutyl aluminum and 5.0 mmol as aluminum atom of methylaluminoxane obtained in the above Example 1, and the resultant was stirred at the polymerization temperature of 50° C. for 30 minutes. Subsequently, 50.0 μmol as titanium atom of pentamethylcyclopentadienyltitanium trimethoxide was added. Further, propylene monomer was introduced through an exclusive line into the reactor, the content of the reactor was sufficiently replaced with propylene monomer, pressure in the reactor was increased to 4.5 kg/cm$^2$G. Then, an exclusive line for propylene monomer was blocked and ethylene monomer was introduced into the reactor through an exclusive line and the pressure was increased to 9.0 kg/cm$^2$G. Then, polymerization was carried out with stirring at 50° C. for 4 hours.

Other operations in Example 10 were repeated to obtain styrene polymer. The yield of thus obtained styrene polymer was 1.01 g. After the same treatment as that in Example 10, the yield of the component soluble in methylene chloride was 0.03 g.

The intrinsic viscosity measured in 1,2,4-trichlorobenzene solution at 135° C. was 0.95 dl/g. Melting point obtained by DSC measurement was 246.0° C. and the composition calculated from $^1$H-NMR spectrum was 10.8 mol. % of styrene unit, 47.6 mol. % of ethylene unit and 41.6 mol. % of propylene unit.

EXAMPLE 12

In the same manner as that in Example 10, except that cyclopentadienyltitanium trichloride was used instead of pentamethylcyclopentadienyltitanium trimethoxide, styrene polymer was obtained. The yield of the resulting styrene polymer was 5.50 g. After the same treatment as that in Example 10, the yield of the component soluble in methylene chloride was 0.16 g.

Melting point of the styrene polymer soluble in methylene chloride was 232.8° C.. Intrinsic viscosity measured in 1,2,4-trichlorobenzene at 135° C. was 1.08 dl/g. The composition calculated from $^1$H-NMR spectrum was 38.7 mol. % of styrene unit, 33.9 mol. % of ethylene unit and 27.4 mol. % of propylene unit.

TABLE 1

| Example No. | Titanium Compound | MAO$^{a)}$ Concentration (mmol) | Styrene Monomer Type | Styrene Monomer Amount (mol) | Olefin Monomer Type | Olefin Monomer Amount (kg/cm$^2$ · G) |
|---|---|---|---|---|---|---|
| Example 1 | Cp*Ti(OCH$_3$)$_3$$^{f)}$ | 10 | Styrene | 1.73 | Ethylene | 8.0 |
| Example 2 | Cp*Ti(OCH$_3$)$_3$$^{f)}$ | 10 | Styrene | 1.73 | Ethylene | 8.0 |
| Example 3 | Cp*Ti(OCH$_3$)$_3$$^{f)}$ | 10 | Styrene | 1.73 | Ethylene | 8.0 |
| Example 4 | Cp*Ti(OCH$_3$)$_3$$^{f)}$ | 10 | Styrene | 1.30 | Ethylene | 8.0 |
| Example 5 | Cp*Ti(OCH$_3$)$_3$$^{f)}$ | 10 | Styrene | 1.30 | Ethylene | 8.0 |
| Example 6 | CpTiCl$_3$$^{j)}$ | 30 | Styrene | 0.65 | Ethylene | 8.0 |
| Example 7 | TET$^{k)}$ | 5 | Styrene | 0.45 | Ethylene | 8.0 |
| Example 8 | Cp*Ti(OCH$_3$)$_3$$^{f)}$ | 10 | p-Methyl-Styrene | 0.76 | Ethylene | 8.0 |
| Example 9 | Cp*Ti(OCH$_3$)$_3$$^{f)}$ | 10 | p-Methyl-Styrene | 0.76 | Ethylene | 8.0 |
| Comparative Example 1 | TET$^{k)}$ | 5 | Styrene | 0.50 | — | — |
| Comparative Example 2 | CpTiCl$_3$$^{j)}$ | 30 | — | — | Ethylene | 8.0 |

| Example No. | Polymerization Temperature (°C.) | Yield (g) | Properties of Copolymer Intrinsic Viscosity$^{b)}$ (dl/g) | Content of Olefin Unit (wt %) | Transition Temperature (°C.) Tg$^{c)}$ | Transition Temperature (°C.) Tm$^{d)}$ | Izod Impact Value$^{e)}$ (kgcm/cm) |
|---|---|---|---|---|---|---|---|
| Example 1 | 70 | 12.2 | 1.30 | 4.0 | 80 | 262 | 2.8 |
| Example 2 | 20 | 45.5 | 5.01 | 50.0 | **$^{h)}$ | 268/126 | 4.5 |
| Example 3 | 20 | 37.4 | 3.08 | 32.0 | **$^{h)}$ | 266/125 | 3.5 |
| Example 4 | 60 | 29.4 | 8.70 | 53.5 | **$^{h)}$ | 261/126 | 3.6 |
| Example 5 | 60 | 50.3 | 4.73 | 78.0 | **$^{h)}$ | 260/126 | 4.6 |

TABLE 1-continued

| Example 6 | 50 | 6.3 | 0.40 | 0.5 | 88 | 260 | 2.6 |
| Example 7 | 50 | 2.0 | 0.87 | 0.7 | 87 | 265 | 2.7 |
| Example 8 | 60 | 31.2 | 7.78 | 38.0 | ••h) | •••i)/122 | 2.2 |
| Example 9 | 60 | 63.1 | 0.73 | 52.2 | ••h) | •••i)/121 | 2.7 |
| Comparative Example 1 | 50 | 18.7 | 1.32 | — | 96 | 267 | 2.0 |
| Comparative Example 2 | 50 | 3.4 | 1.50 | 100.0 | −90 | 126 | 5.6 | a)Methylaluminoxane
b)Measured in 1,2,4-trichlorobenzene solution at 135° C.
c)Glass transition temperature
d)Melt temperature (Melting point)
e)Measured according to JIS-K7110
f)Pentamethylcyclopentadienyltitanium trimethoxide
h)The peak cannot be observed because it overlaps with melting point peak of polyethylene
i)Stereostructure of p-methylstyrene chain had been confirmed by $^{13}$C-NMR
j)Cyclopentadienyltitanium trichloride
k)Tetraethoxytitanium

EXAMPLE 13

(1) Preparation of styrene-1,3-Butadiene Copolymer

In a 1.0-liter reactor equipped with a stirrer were placed 100 ml of styrene and 6.0 mmol as aluminum atom of methylaluminoxane obtained in the above Example 1 (1), and the resultant was stirred at the polymerization temperature of 30° C. for 30 minutes. Subsequently, 56.3 g of 1,3-butadiene was charged in a stainless steel catalyst-input tube which had been sufficiently replaced with nitrogen, and added to the reaction system, and, at the same time, 0.03 mmol as titanium atom of pentamethylcyclopentadienyltitanium trimethoxide was added. And polymerization was carried out at 40° C. for 5 hours with stirring. After reaction was over, methanol was poured to stop the reaction. Further, a mixture of methanol-hydrochloric acid was added to decompose the catalyst components. Then, washing with methanol was repeated three times. The yield of thus obtained styrene-1,3-butadiene copolymer was 41.4 g. Intrinsic viscosity measured in 1,2,4-trichlorobenzene at 135° C. was 1.63 dl/g.

The fact that styrene chain of this styrene-1,3-butadiene copolymer has syndiotactic configuration was certified by the result of analysis by differential scanning calorimeter (DSC) and nuclear magnetic resonance spectrum (NMR).

(a) Determination by DSC

After the styrene copolymer obtained in Example 13 was completely dried, 10 mg portion was charged in a vessel for DSC. The temperature was increased from 50° C. to 300° C. at a rate of 20° C./min, then kept at 300° C. for 5 minutes, and decreased from 300° C. to 50° C. at a rate of 20° C./min. This sample was heated again from 50° C. to 300° C. at a rate of 20° C./min, and the endo- and exothermic pattern was observed. The apparatus used was DSC-II manufactured by Perkin-Elmer Co.

As the result, the glass transition temperature (Tg) and the melt temperature (melting point) (Tm) of this copolymer was 82° C. and 269° C., respectively.

The facts that the conventional atactic polystyrenes do not have melt temperature, the melt temperature of isotactic polystyrene is 230° C. and the melt temperature of copolymer never exceeds the higher melt temperature of homopolymers show that the styrene chain of this copolymer has syndiotactic configuration and the copolymer is crystalline substance.

(b) Determination by $^{13}$C-NMR

The above styrene copolymer was analyzed in 1,2,4-trichlorobenzene solution at 135° C. As the result, the aromatic signals were observed at 145.1 ppm and 145.9 ppm. Accordingly, the styrene chain was confirmed to have syndiotactic configuration. Further, signals due to butadiene chain were found at 22.3 ppm and 27.5 ppm. The content of 1,3-butadiene chain in the copolymer was 8.0 wt. %. The apparatus used was FX-200 manufactured by Nippon Denshi Co.

(c) Morphology of the products

The copolymer was injection molded at melt temperature of 300° C. and at mold temperature of 100° C. The cross section of the injection molded product was observed. As the result, it showed good dispersion state with only very small domains dispersed therein, which can not be observed in the general incompatible mixture. Izod impact value of the molded product was measured according to JIS-K7110.

The results are shown in Table 2. Further, gloss was observed with the naked eye to find that gloss of the product was improved by copolymerization.

The above facts show that the copolymer is a crystalline styrene-butadiene copolymer which contains styrene chain having syndiotactic configuration. Further, moldability was improved by decreasing Tg, and flexibility was imparted to improve impact resistance. Moreover, gloss was improved.

EXAMPLES 14 TO 16 AND COMPARATIVE EXAMPLES 3 TO 5

The procedure to Example 13 was repeated using starting materials, catalysts and polymerization conditions shown in the following Table 2, and styrene-butadiene copolymers or styrene-isoprene copolymers were obtained. The characteristics of the resulting copolymers as well as the result of Example 13 are shown in Table 2.

TABLE 2

| | Catalyst | | | Monomer | | | | Polymerization |
|---|---|---|---|---|---|---|---|---|
| | Titanium Compound | | | Styrene Monomer | | Comonomer | | |
| Example No. | Type | Amount (mmol) | MAO (mmol) | Type | Amount (mmol) | Type | Amount (mmol) | Temperature (°C.) |
| Example 13 | Cp*Ti(OCH$_3$)$_3$$^{m)}$ | 0.03 | 6 | Styrene | 1.30 | 1,3-Butadiene | 1.04 | 30 |

TABLE 2-continued

| | | | | | | | | |
|---|---|---|---|---|---|---|---|---|
| Example 14 | Cp*Ti(OCH₃)₃[m] | 0.03 | 6 | Styrene | 1.30 | Isoprene | 1.50 | 30 |
| Example 15 | CpTiCl₃[n] | 0.03 | 30 | Styrene | 1.25 | 1,3-Butadiene | 0.25 | 20 |
| Example 16 | CpTiCl₃[n] | 0.03 | 30 | Styrene | 0.25 | Isoprene | 0.25 | 50 |
| Comparative Example 3 | CpTiCl₃[n] | 0.03 | 30 | Styrene | 0.50 | — | — | 50 |
| Comparative Example 4 | CpTiCl₃[n] | 0.03 | 30 | — | — | 1,3-Butadiene | 8.0 | 50 |
| Comparative Example 5 | CpTiCl₃[n] | 0.03 | 30 | — | — | Isoprene | 8.0 | 50 |

| | | | Copolymer | | | | |
|---|---|---|---|---|---|---|---|
| Example No. | Yield (g) | Intrinsic Viscosity[q] (dl/g) | Content of Diene (wt %) | Glass Transition Temperature (°C.) | Melting Temperature (°C.) | Izod Impact Value (kgcm/cm) | Gloss[r] |
| Example 13 | 41.4 | 1.63 | 8.0 | 82.0 | 269 | 3.7 | ∘ |
| Example 14 | 34.9 | 0.86 | 10.0 | 82.0 | 270 | 4.3 | ⊚ |
| Example 15 | 14.3 | 0.62 | 0.9 | 90.0 | 259 | 1.5 | ∘ |
| Example 16 | 2.9 | 0.35 | 0.5 | 91.0 | 264 | 1.4 | Δ |
| Comparative Example 3 | 16.2 | 1.12 | — | 97.0 | 268 | 1.0 | Δ |
| Comparative Example 4 | 11.6 | 0.74 | 100 | −102.0 | 87 | *s) | *s) |
| Comparative Example 5 | 2.0 | 0.80 | 100 | −73.0 | 6 | *s) | *s) |

[m] Pentamethylcyclopentadienyltitanium trimethoxide
[n] Cyclopentadienyltitanium trichloride
[p] Methylaluminoxane
[q] Measured in 1,2,4-trichlorobenzene at 135° C.
[r] Estimated by visual observation
⊚: very good
∘: good
Δ: bad
[s] Molding by Injection molding was difficult.

INDUSTRIAL APPLICABILITY

The styrene copolymer of the present invention possesses heat resistance and chemical resistance of syndiotactic polystyrene, and can be injection molded at low temperature because of its reduced glass transition temperature. Further, gloss and flexibility are greatly improved. Particularly, styrene copolymer consisting of styrene monomer (a) and olefin monomer (b) is excellent in compatibility with polyolefin.

Accordingly, the styrene copolymer of the present invention is useful as various kinds of structural materials and compatibilizing agent. Such copolymer can be efficiently produced according to the process of the present invention.

What is claimed is:

1. A styrene copolymer having a repeating unit (a) represented by the formula:

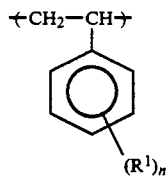

wherein $R^1$ is a hydrogen atom, a halogen atom, a vinyl group or an alkyl group having not more than 20 carbon atoms; n is an integer of 1 to 3, and when n is plural, $R^1$ may be the same or different, and an olefin repeating unit (b) represented by the formula:

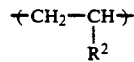

wherein $R^2$ is a hydrogen atom or a saturated hydrocarbon group having not more than 20 carbon atoms or aliphatic or an alicyclic diene repeating unit (c), which contains 32 to 78 wt. % of said olefin repeating unit (b) or 0.1 to 99.9 wt. % of said diene repeating unit (c), wherein intrinsic viscosity measure din 1, 2, 4-trichlorobenzene at 135° C. is 0.07 to 20 dl/g and the stereoregularity of said styrene repeating unit chain is a high degree of syndiotactic configuration.

2. The styrene copolymer according to claim 1, consisting essentially of the styrene repeating unit (a) and the olefin repeating unit (b), which contains 32 to 50 wt. % of said olefin repeating unit (b).

3. The styrene copolymer according to claim 1 consisting essentially of the styrene repeating unit (a) and the diene repeating unit (c) which contains 0.1 to 50 wt. % of said diene repeating unit (c).

4. The styrene copolymer according to claim 1, wherein said copolymer contains 1 to 99 wt. % of said diene repeating unit (c).

5. The styrene copolymer according to claim 1, wherein said copolymer contains 5–95 wt. % of said diene repeating unit (c).

6. The styrene copolymer according to claim 1, wherein said copolymer contains 50–78 wt. % of said olefin repeating unit (b).

7. A process for production of the styrene copolymer of claim 1, which comprises copolymerizing styrene monomer represented by the formula:

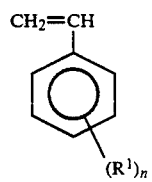

wherein, R¹ and n are the same as defined above and olefin monomer represented by the formula:

wherein R² is the same as defined above or aliphatic or alicyclic diene monomers in the presence of a catalyst comprising a transition metal compound and alkylaluminoxane.

8. The process according to claim 7, wherein said transition metal compound is at least one compound selected from a group consisting of titanium compound, zirconium compound, hafnium compound and vanadium compound.

9. The process for production of the styrene copolymer according to claim 8, wherein the titanium compound is represented by the general formula:

wherein R is a cyclopentadienyl group, a substituted cyclopentadienyl group or an indenyl group; X, Y and Z are independently a hydrogen atom, an alkyl group having 1 to 12 carbon atom, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom.

10. The process for production of the styrene copolymer according to claim 7, wherein said alkylaluminoxane is methylaluminoxane which contains not more than 50% of a high magnetic components (−0.1 to −0.5 ppm based on methyl proton of toluene (2.35 ppm) under conditions for measurement of toluene solvent) in the region of the methyl proton signal due to aluminum-methyl group (Al—CH₃) bond observed by proton nuclear magnetic resonance method.

11. The process according to claim 7 wherein the olefin repeating unit (b) is used.

12. The process according to claim 7 wherein R¹ is hydrogen, chlorine, bromine, fluorine, iodine, methyl, ethyl, propyl, butyl, pentyl, hexyl or vinyl.

13. The process according to claim 11 wherein the repeating unit (b) is ethylene or propylene repeating unit.

14. The process according to claim 7 wherein the repeating unit (a) is styrene repeating unit and the olefin repeating unit (b) is ethylene repeating unit.

15. The process according to claim 7 wherein the repeating unit (a) is p-methyl styrene repeating unit and the olefin repeating unit is ethylene repeating unit.

16. The process according to claim 7 wherein R¹ is hydrogen, chlorine, bromine, fluorine, iodine, methyl, ethyl, propyl, butyl, pentyl, hexyl or vinyl.

17. The process of claim 7 wherein R¹ is hydrogen, chlorine, bromine, fluorine, iodine, methyl, ethyl, propyl, butyl, pentyl, hexyl or vinyl; and the repeating unit (b) is used.

18. The process of claim 17, wherein the repeating unit (b) is ethylene or propylene.

19. The process of claim 17 wherein R¹ is hydrogen or methyl.

20. A styrene copolymer having a repeating unit (a) represented by the formula:

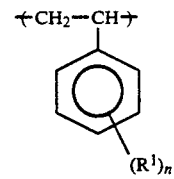

wherein R¹ is a hydrogen atom, a halogen atom, a vinyl group or an alkyl group having not more than 20 carbon atoms; n is an integer of 1 to 3, and when n is plural, R¹ may be the same or different, and an aliphatic or alicyclic diene repeating unit (c), which contains 0.1 to 99.9 wt. % of said aliphatic or alicyclic diene repeating unit (c), and wherein said copolymer has an intrinsic viscosity measured in 1,2,4-trichlorobenzene at 135° C. of 0.07 to 20 dl/g and the stereoregularity of said styrene repeating unit chain is a high degree of syndiotactic configuration.

21. A process for producing a styrene copolymer having a repeating unit (a) represented by the formula:

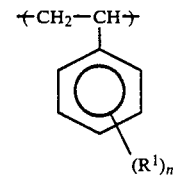

wherein R¹ is a hydrogen atom, a halogen atom, a vinyl group or an alkyl group having not more than 20 carbon atoms; n is an integer of 1 to 3, and when n is plural, R¹ may be the same or different, and an aliphatic or alicyclic diene repeating unit (c), which contains 0.1 to 99.9 wt. % of said diene repeating unit (c), and wherein the intrinsic viscosity of said copolymer measured in 1,2,4-trichlorobenzene at 135° C. is 0.07 to 20 dl/g and the stereoregularity of said styrene repeating unit chain is a high degree of syndiotactic configuration, which comprises copolymerizing a styrene monomer having the formula:

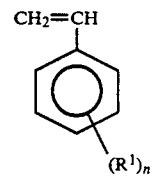

wherein R¹ and n are as defined above, and an aliphatic or alicyclic diene monomer in the presence of a catalyst comprising a transition metal compound and alkylaluminoxane.

22. The process of claim 21, wherein the repeating unit (a) is styrene and the repeating unit (c) is 1,3-butandiene.

23. The process of claim 21, wherein the repeating unit (a) is styrene and the repeating unit (c) is isoprene.

* * * * *